March 10, 1936.  G. W. MUDD  2,033,849
LABELING MACHINE
Filed Jan. 13, 1932  4 Sheets-Sheet 1

Inventor:
Garrett W. Mudd
By:

March 10, 1936. G. W. MUDD 2,033,849
LABELING MACHINE
Filed Jan. 13, 1932 4 Sheets-Sheet 3
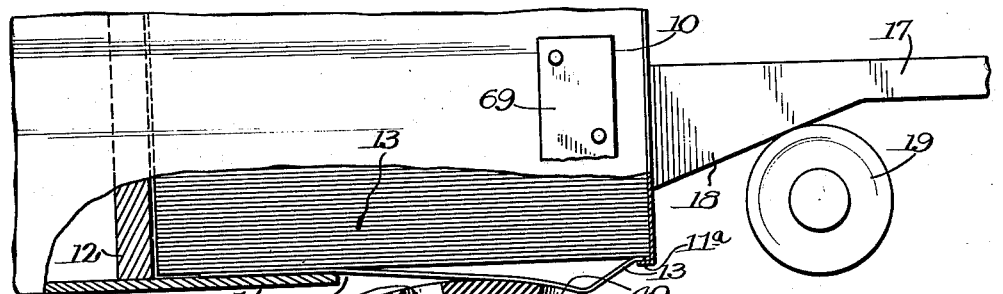
Fig. 3.
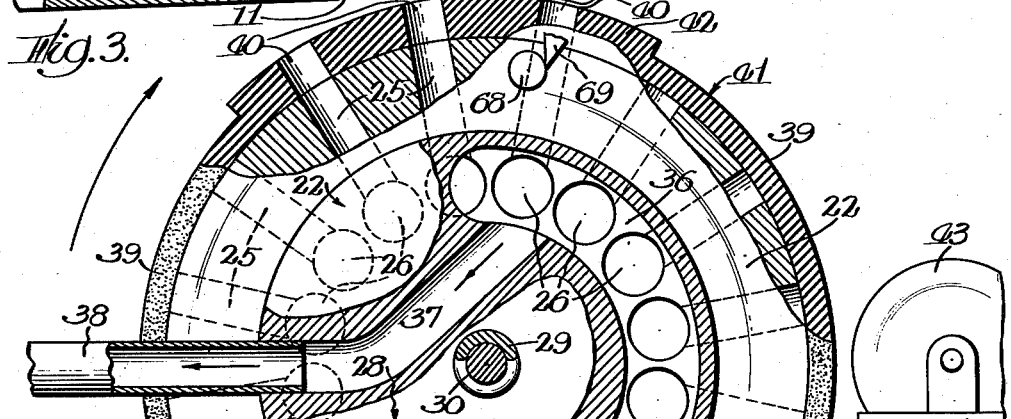
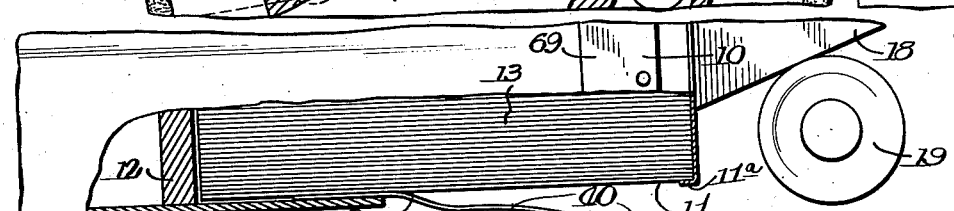
Fig. 4.
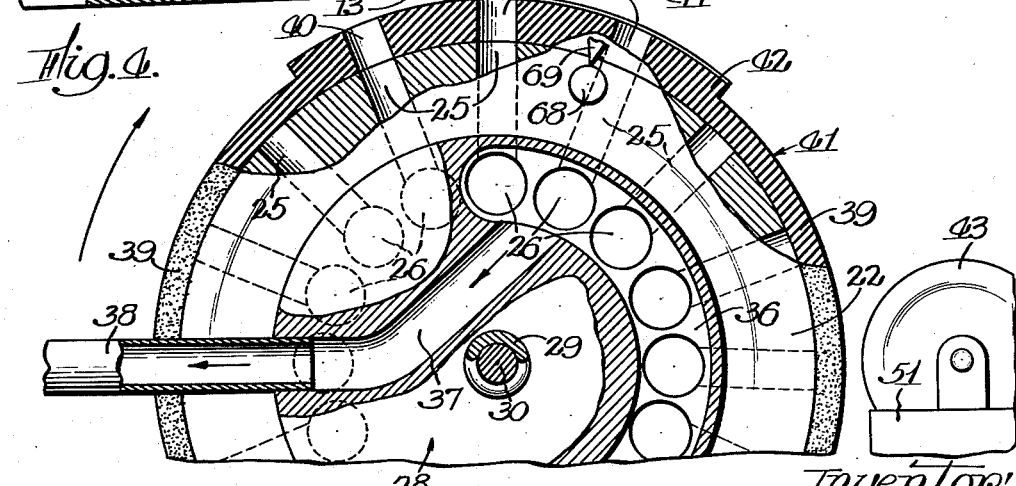
Inventor:
Garrett W. Mudd
By:

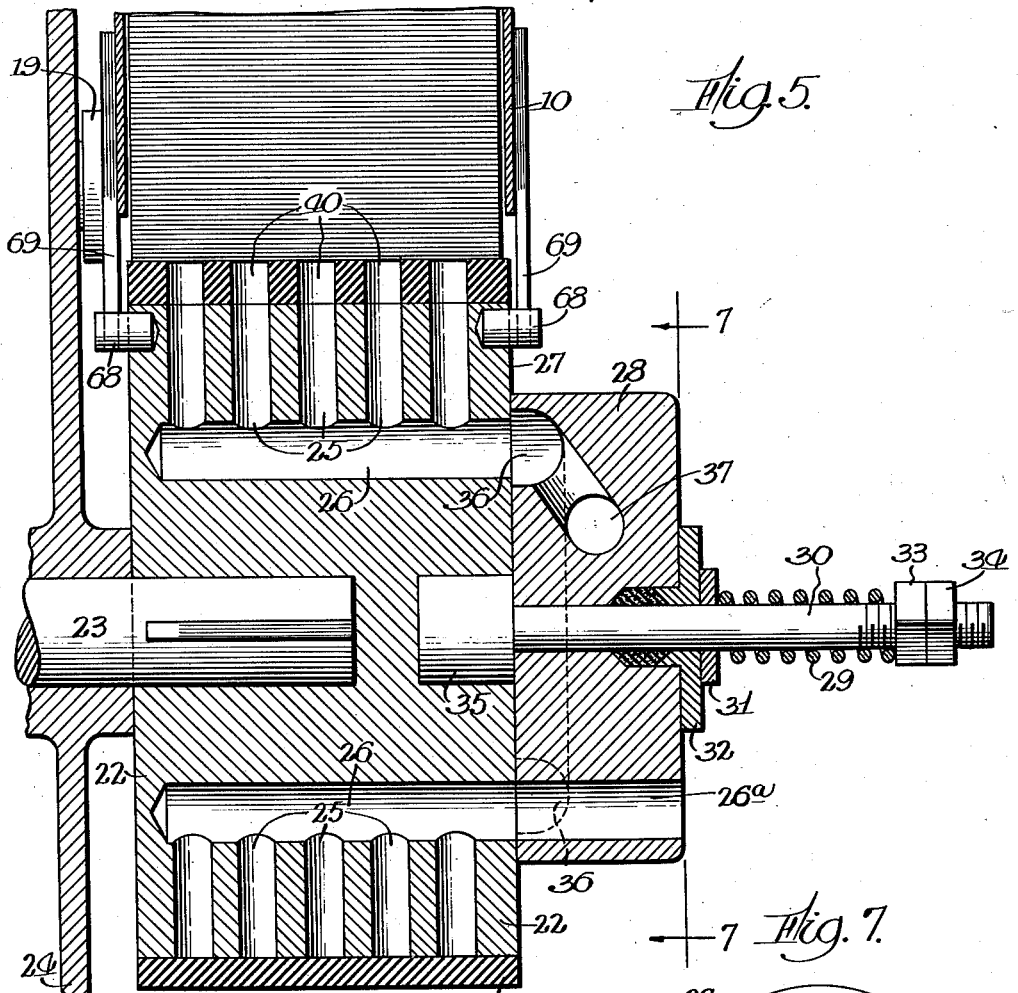
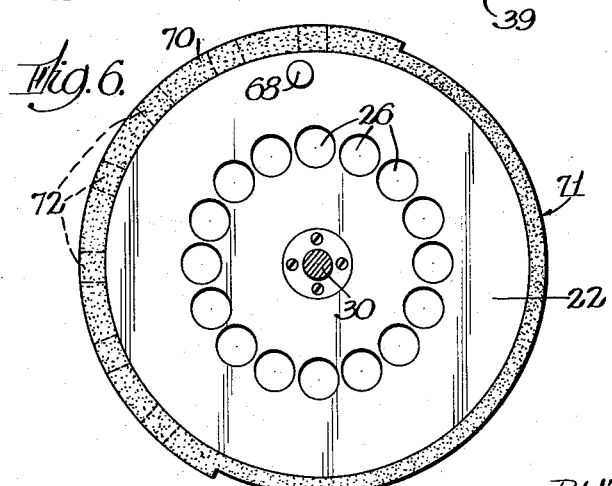
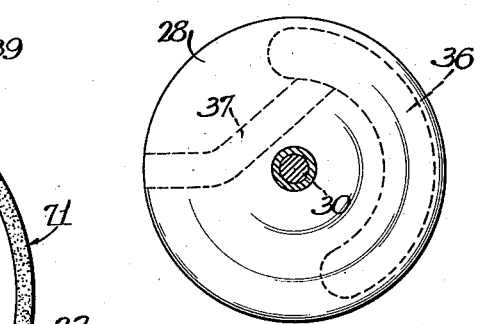

Patented Mar. 10, 1936

2,033,849

UNITED STATES PATENT OFFICE 2,033,849

LABELING MACHINE

Garrett W. Mudd, Chicago, Ill.

Application January 13, 1932, Serial No. 586,379

8 Claims. (Cl. 271—29)

This invention relates to improvements in machines for applying labels to packages or containers of the type in which the labels are successively removed from the bottom of the supply or stack of labels by means of suction and conveyed and applied to the containers as the latter are advanced.

Heretofore in machines of this type, and especially of the type in which the suction creating means embodies a rotatable drum or member, considerable difficulty and inconvenience has been experienced in that the suction member does not always secure a firm enough hold upon the labels to remove the same from the supply, as the latter is maintained stationary, and due to the rapidity in which the suction member or drum rotates, together with the tension created upon the bottom label of the supply by the weight of the superposed labels.

It is one of the objects of the present invention to overcome these difficulties and objections and to provide in a labeling machine a rotatable suction creating drum or member for grasping and removing the lowermost label, and a hopper or holder for the supply, which latter is mounted for movement with the drum or suction member, during a portion of the rotation of the latter, and which member or drum is provided with a plurality of openings through which suction is created to cause successive portions of the periphery of the drum or member to grasp the label as the latter is being advanced or removed from the supply, to assist in the removal of the label.

A further object is to provide improved means for relieving the suction to release the label as it is being applied to the container.

A further object is to provide improved means whereby the parts may be readily adjusted to compensate containers of different sizes.

A further object is to provide improved means for compensating labels of different sizes.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in elevation, partly in section, partly broken away and with parts omitted, of a labeling machine of this character constructed in accordance with the principles of this invention and showing the parts in one position.

Figure 3 is an enlarged detail sectional view of the rotatable drum and suction creating means, showing the position some of the parts will assume when the label is partially removed from the supply.

Figure 4 is a view similar to Figure 3 with parts in another position.

Figure 5 is a detail sectional view taken on line 5—5, Figure 1, on an enlarged scale.

Figure 6 is a view of a modified form of label engaging means.

Figure 7 is a view taken on line 7—7, Figure 5, with parts omitted.

Figure 1:
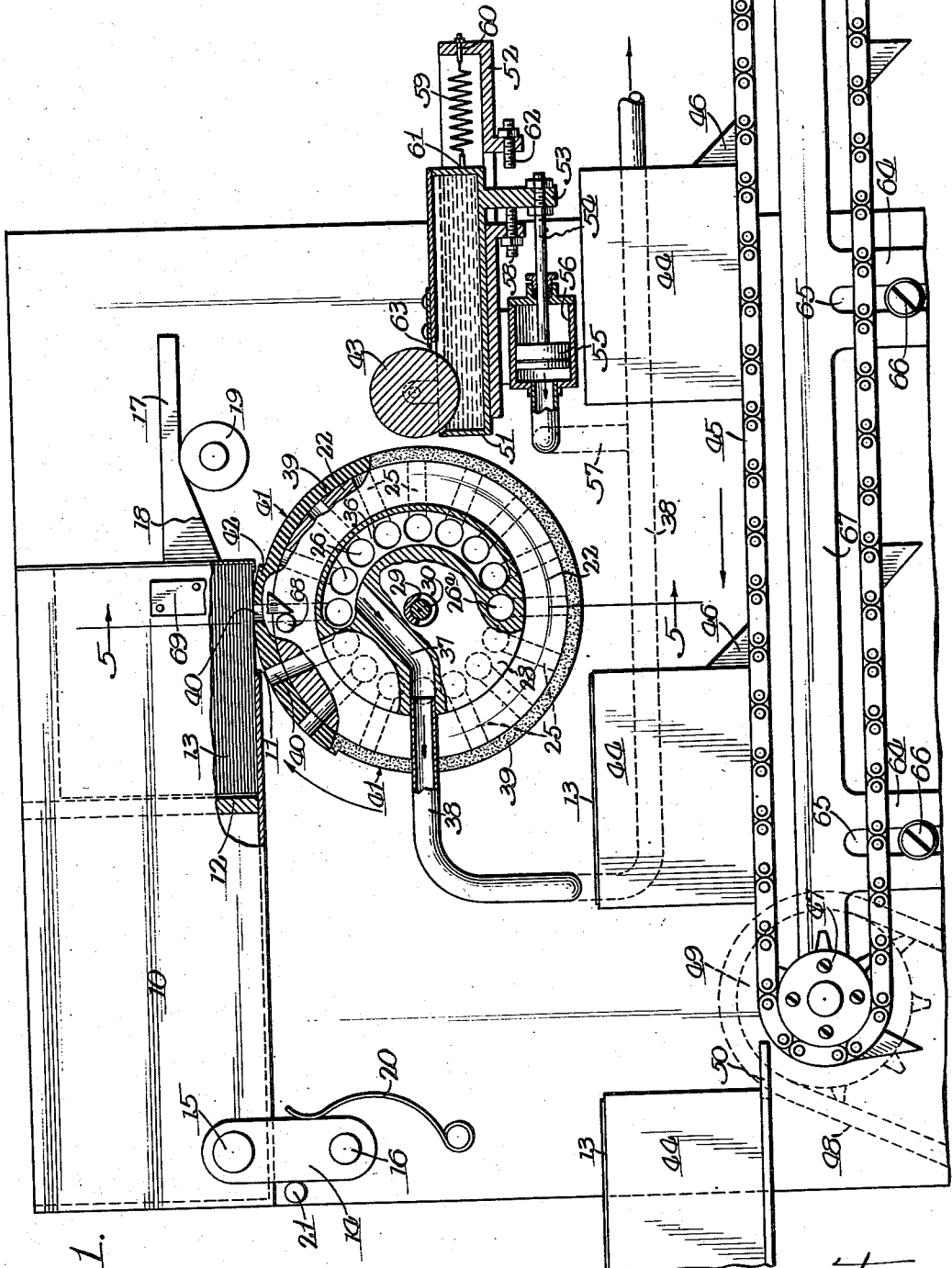

Referring more particularly to the drawings the numeral 10 designates generally a hopper or container for the labels having an outlet opening 11 in the bottom thereof, preferably adjacent one end, and within the container is arranged an adjustable follower or partition 12 adapted to be positioned to accommodate a supply of superposed labels 13. The partition 12 may be adjusted lengthwise of the container and secured in position in any suitable manner (not shown) to accommodate labels of different sizes.

The hopper or container 10 is adapted for bodily swinging movement and to that end links 14 are provided, one end of which links are pivotally connected as at 15 to the hopper and the other ends of the links are pivotally connected as at 16 to a suitable support. Connected to the forward end of the hopper is an arm 17 having an inclined surface 18 and the arm engages and rests upon a roller 19 suitably mounted, so that when the hopper 10 is moved bodily forward or to the right from the position shown in Figure 1, in a manner to be set forth, the inclined surface 18 of the arm 19 will ride upon the roller 19 and at the same time raise or elevate the hopper 10, causing the same to swing about the pivots 15 and 16. A suitable spring 20 may be provided which tends normally to move the hopper 10 back to its normal position and the springs preferably engage the links 14, a stop 21 being provided to be engaged by the links so as to limit the movement of the links under the stress of the spring 20.

Rotatably mounted beneath the outlet opening 11 of the hopper is a drum 22 which is preferably secured to a shaft 23 journaled in a suitable support 24 and which shaft is rotated in any desired or suitable manner, not shown. The drum may be of any desired length but is preferably of a length substantially co-extensive with the length of the opening 11 in the bottom of the hopper.

The drum is provided with a plurality of radially arranged openings 25 which extend through the periphery of the drum and also extend about the drum, and these openings have communication with longitudinal openings 26 which extend through the lateral face 27 of the drum. A stationary member 28 is disposed adjacent the face 27 of the drum, through which the openings 26 pass, and this member is held in contact with the face 27 in any suitable manner preferably by means of a spring 29, which encompasses a rod or member 30 that extends through the stationary member 28. One end of the spring 29 engages a washer or collar 31 which bears against a packing nut or gland 32, and the other end of the spring engages a nut 33 threaded upon the rod 30, a lock nut 34 being provided which abuts the nut 33. The inner end of the rod 30 is provided with a head or enlarged portion 35 seated in a recess in the drum 22, opening through the face 27.

A channel 36 is provided in the member 28 and opens through the face of the member 28, which abuts the face 27 of the drum. This channel 36 extends for only a portion of the distance about the axis of the drum and is closed at the ends, being positioned so that when the drum 22 is rotated the openings 26 will move into and out of communication therewith. The channel 36 may be of any desired length according to the length of time during the cycle of rotation of the drum 22 that it is desired to maintain a suction through certain of the passages or openings 25. The member 28 is provided with a passage 37 which communicates with the channel 36, and connected to the passage 37 is one end of a suction pipe 38, through which latter suction is created at a suitable source and in a suitable manner.

Encompassing the drum 22 is a shell or sleeve 39 constructed preferably of suitable elastic material, such as rubber or the like and this shell or sleeve is provided with openings 40 extending therethrough which, when the sleeve or shell is placed upon the drum will register with the openings 25. The openings 40 through the sleeve 39 are arranged in a predetermined portion of the sleeve and any desired number of these openings 40 may be provided. The periphery of the sleeve 39 is reduced as at 41 to form a high portion 42 on the periphery of the sleeve, for a purpose to be set forth, and the drum 22 and opening 11 in the bottom of the container 10 are so disposed with respect to each other that when the drum is rotated, the high portion 42 of the sleeve will project into the opening 11 of the container, to engage the lowermost label 13 of the supply, and when one or more of the openings 40 contacts with the label a suction is created through the pipe 38. This suction will be manifested in the channel 36, thence through predetermined ones of the openings 26 and through the openings 25 in the drum as well as through the openings 40 in the sleeve so as to cause the label, or a portion thereof to adhere to the periphery of the drum. When the drum is then rotated, another one of the openings 26 will pass into communication with the channel 36, as shown more clearly in Figure 3 of the drawings, to create suction upon another portion of the label to assist in withdrawing the label from the container.

The label will then adhere to the periphery of the drum by reason of the suction created through the openings 40 and will be conveyed, as the drum is rotated, past a paste applying roller 43 and from there will be conveyed by the drum to a position that the label will be placed upon a container 44 which is being advanced during the rotation of the roller. The containers 44 are moved forwardly in any suitable manner such as by means of a flexible conveyor 45 having flights or projections 46 secured thereto to engage the rear face of the containers and advance them. The conveyor 45 is given a traveling movement in any suitable manner, preferably by passing over a sprocket wheel 47, which is driven by means of a suitable belt 48 passing over a pulley 49 that is secured to the sprocket wheel, and which belt is given its motion from any suitable source, not shown. The containers pass off of the conveyor 45 on to a support 50, to be conveyed away.

The paste applying roller 43 is mounted so that a portion of its periphery will operate in a paste pot 51 mounted for bodily movement toward and away from the periphery of the drum. The paste pot 51 is mounted to slide upon a support 52 and has a depending arm 53 to which is connected a piston rod 54 having a piston 55 secured thereto. The piston 55 operates in a cylinder 56, which latter is secured preferably to the support 52. The suction pipe 38 is provided with a branch 57 which has communication with the cylinder 56 on one side of the piston so that when suction is created in the pipe 38, it will be manifested in the cylinder 56 so as to draw the piston in a direction to move the paste pot 51 toward the periphery of the drum, a stop 58 being provided to limit such movement of the paste pot. A spring 59 is provided which tends normally to retract the paste pot and with it the piston 55. One end of this spring 59 is anchored as at 60 to a fixed support and the other end is secured as at 61 to the paste pot and tends normally to retract the paste pot and the piston, when the same overcomes the suction in the cylinder 56. A stop 62 is provided for limiting the movement of the paste pot under the influence of the spring 59.

It will thus be manifest that when suction is created in the cylinder 56, the parts will assume the position shown in Figure 1 and the spring 59 will be placed under tension. As soon as the suction is relieved in the cylinder 56, the spring 59 will retract the paste pot and with it the paste applying roller 43. A scraper 63 may be provided for the paste applying roller, if desired.

In order to compensate for containers 44 of different sizes, the conveyor 45 is mounted upon a support for adjustment towards and away from the axis of the drum in any suitable manner, such as by means of depending portions 64 having slots 65 therein, through which fastening screws 66 pass. By loosening the fastening screws 66 it will be manifest that the support 67 upon which the sprocket wheels 47 are mounted, may be raised or lowered and then secured in their adjusted position.

Projecting laterally from the drum 22 and preferably on opposite sides thereof are pins 68 which are adapted to engage arms 69 that depend below the bottom of the hopper or container 10, and these pins 68 and arms 69 are so arranged that as soon as one of the openings 40 in the sleeve or shell 39 is adjacent the lower face of the lowermost label 13 in the container, the respective openings 26 in communication therewith will be in communication with the channel 36 so that suction will be exerted through the openings 40 to grasp the lowermost label.

As the drum rotates further in the same direction as indicated by the arrow in Figure 1, the label will be drawn from the hopper or container 10 in the manner shown in Figure 3, and at the same time the pins 68 engaging the arms 69 will move the hopper or container forwardly so as to cause the same to follow or move with the drum during a portion of the rotation of the latter. As the hopper or container is moved forwardly the inclined portion 18 on the arm 17 will raise the hopper to the position shown in Figures 3 and 4, to assist in removing the lowermost label from the hopper. As the next adjacent openings 40 successively approach the lowermost label as shown in Figures 3 and 4, further suction will be created upon the label to hold the same against the periphery of the drum. The high portion 42 of the shell or sleeve 39 tends to hold the label against the paste applying roller 43.

Obviously, the channel 36 may be of any desired length according to the length of label which it is desired to handle, and so as to accommodate sleeves or shells 39 having different numbers of openings 40 therethrough to accommodate different size labels.

Figure 2:
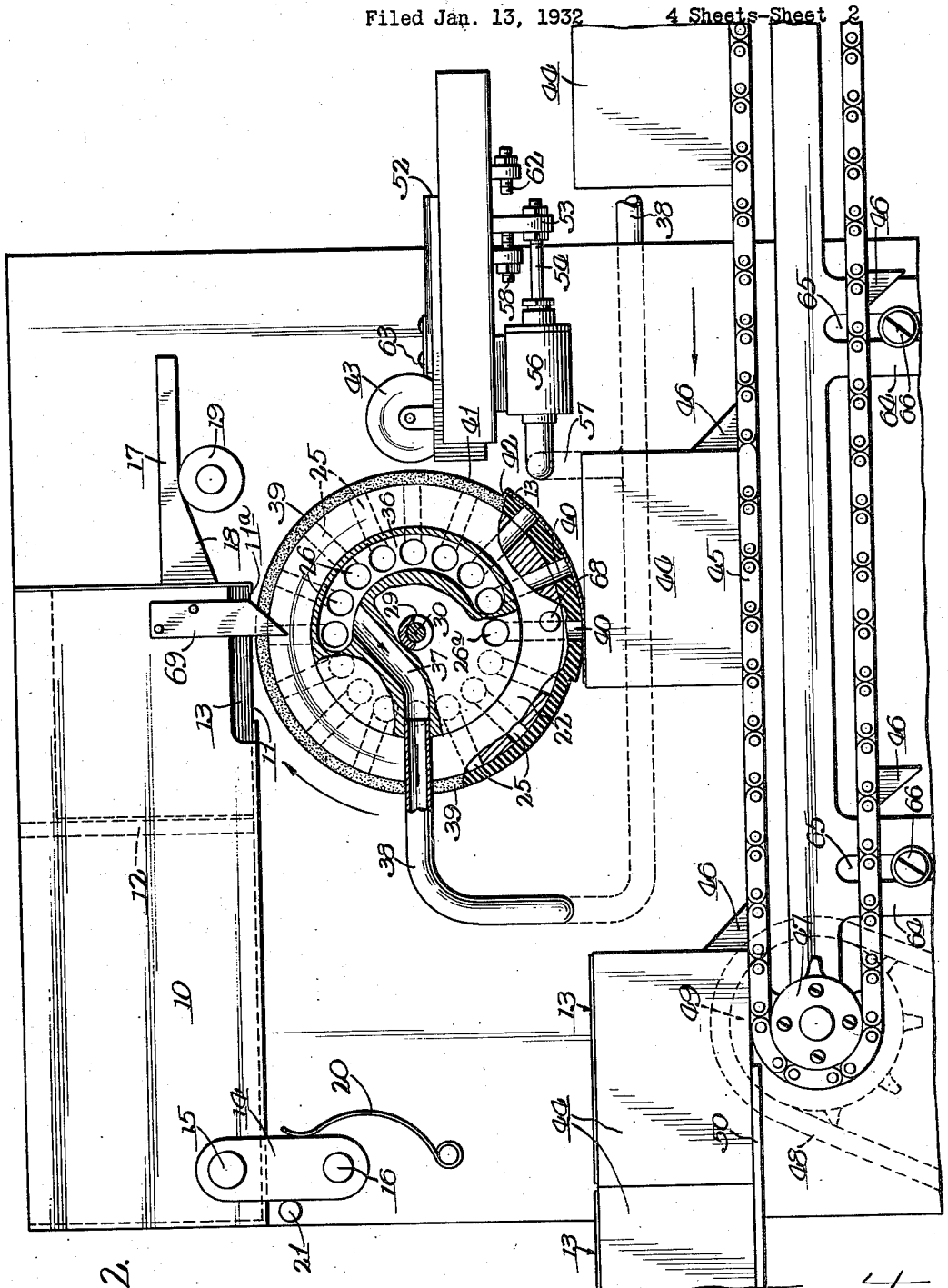
Figure 2 is a view similar to Figure 1, showing some of the parts in another position.

As shown in Figures 1, 2 and 3, the shell or sleeve 39 is provided with three rows or sets of openings 40 therethrough, but in the form of the invention shown in Figure 6, when it is desired to handle labels of a larger size, the length of the high portion 70 of the sleeve 71 will be varied and obviously a greater number of openings 72 will be provided through the high portion 70.

With this improved construction it will be manifest that the paste pot 51 and paste applying roller 43 will be moved in timed relation to the rotation of the drum, owing to the fact that the suction from the same source through the pipe 38 is applied within the cylinder 56 and also within the channel 36.

It will also be manifest that by reason of the hopper or container 10 moving bodily with the drum as the latter rotates and for a portion of the rotation of the latter and at the same time being moved away from the drum, a positive grip upon the label will be insured and the label will be held against the drum until the respective openings 26 pass out of registering relation with the channel 36, at which time such openings 26 will communicate with an open passage 26ᵃ to permit outside air to enter the openings 25 which are out of register with the channel 36 to relieve the suction and permit the label to be detached from the drum.

During the applying of the label to the container the high portion 42 of the sleeve 39 will assist in forcing the label against the container and as the sleeve is preferably constructed of yieldable or resilient material, an application of the label to the container will be insured.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In a labeling machine a container for holding a supply of superposed labels, a rotatable drum having one or more openings through its periphery, means for creating suction through said openings for removing the lowermost label from the supply, means mounting said container for bodily movement with the drum during a portion of the cycle of operation of the drum and while the label is being removed from the supply, and means for moving the container away from the periphery of the drum during a portion of the movement of the container with the drum and in a direction transverse to the axis of the drum.

2. In a labeling machine, a container for holding a supply of labels, suction means for removing the labels, means for moving the suction creating means into contact with the label and for moving the label away from the supply, means mounting the said container for bodily movement with the suction means during a portion of the movement of the suction means and while the label is being removed from the container, and means for bodily moving the container away from the suction means during the advancement of the container with the suction means and while the label is being removed from the container.

3. In a labeling machine, a container for holding a supply of labels, a rotatable suction head, means for creating a suction in said head for removing the labels from the container, means for relieving the suction to permit the label to be detached from said head, means mounting the container for a bodily traveling movement with said head during a portion of the rotation of the head, co-operating means operatively related to the said head and container for effecting the said bodily movement of the container, and means operating automatically to bodily move the container away from the suction head in a direction transverse to the direction of bodily movement of the container with the suction head.

4. In a labeling machine, a container for holding a supply of labels, a rotatable suction head, means for creating a suction in said head for removing the labels from the container, means for relieving the suction to permit the label to be detached from said head, means mounting the container for a bodily traveling movement with said head during a portion of the rotation of the head, co-operating means operatively related to the said head and container for effecting the said bodily movement of the container, means for returning the container while the direction of movement of the suction head remains constant, and means operating automatically to bodily move the container away from the suction head in a direction transverse to the direction of bodily movement of the container with the suction head.

5. In a labeling machine, a container for holding a supply of labels, a rotatable drum having radial openings through its periphery, there being an opening through the end of the drum communicating with the said radial openings, a chamber into and out of communication with which the openings through the end of the drum are successively movable, means for creating suction in said chamber to be manifested through said radial openings as the latter communicate with the chamber to remove the labels from the container, means mounting said container for bodily movement with the drum during a portion of the rotation of the latter and while a label is being removed from the supply, means for thus moving the container, and means for returning the container to its normal position.

6. In a labeling machine, a container for holding a supply of labels, a rotatable drum having radial openings through its periphery, there being an opening through the end of the drum communicating with the said radial openings, a chamber into and out of communication with which the openings through the end of the drum are successively movable, means for creating suction in said chamber to be manifested through said radial openings as the latter communicate with the chamber to remove the labels from the container, means mounting said container for bodily movement with the drum during a portion of the rotation of the latter and while a label is being removed from the supply, means for thus moving the container, means for bodily moving the container away from the periphery of the drum and in a direction transverse to the axis of the drum at a predetermined time in the cycle of rotation of the drum and as a label is being removed, and means for returning the container to its normal position.

7. In a labeling machine, a container for holding a supply of labels, a rotatable drum having radial openings through its periphery, there being an opening through the end of the drum communicating with the said radial openings, a chamber into and out of communication with which the openings through the end of the drum are successively movable, means for creating suction in said chamber to be manifested through said radial openings as the latter communicate with the chamber to remove the labels from the container, means mounting said container for bodily movement with the drum during a portion of the rotation of the latter and while a label is being removed from the supply, means for thus moving the container, means for bodily moving the container away from the periphery of the drum and in a direction transverse to the axis of the drum at a predetermined time in the cycle of rotation of the drum and as a label is being removed, and means for returning the container to its normal position independently of the drum and while the direction of rotation of the drum remains constant.

8. In a labeling machine, in combination, a container for holding a supply of superposed labels, a rotatable drum provided with a plurality of openings distributed around the surface thereof, means for simultaneously creating suction at a plurality of said openings distributed around the drum for permitting the suction at said openings to remove the lowermost label from the supply and to hold the label wrapped about the drum at a plurality of points along the length of the label to thereby permit the application of adhesive to the label while the latter is supported by and wrapped about the drum, and means mounting said container for bodily movement with the drum during a portion of the cycle of operation of the drum and while the label is being removed from the supply.

GARRETT W. MUDD.